United States Patent
Maloney

(10) Patent No.: US 11,428,256 B2
(45) Date of Patent: Aug. 30, 2022

(54) FASTENER FOR THIN SHEET MATERIAL

(71) Applicant: Penn Engineering & Manufacturing Corp., Danboro, PA (US)

(72) Inventor: Michael Maloney, Doylestown, PA (US)

(73) Assignee: Penn Engineering & Manufacturing Corp., Danboro, PA (US)

( * ) Notice: Subject to any disclaimer, the term of this patent is extended or adjusted under 35 U.S.C. 154(b) by 213 days.

(21) Appl. No.: 16/678,509

(22) Filed: Nov. 8, 2019

(65) Prior Publication Data

US 2020/0149575 A1 May 14, 2020

Related U.S. Application Data

(60) Provisional application No. 62/760,508, filed on Nov. 13, 2018.

(51) Int. Cl.
| | |
|---|---|
| *F16B 37/06* | (2006.01) |
| *F16B 19/05* | (2006.01) |
| *F16B 39/02* | (2006.01) |

(52) U.S. Cl.
CPC ............ *F16B 19/05* (2013.01); *F16B 37/065* (2013.01); *F16B 39/02* (2013.01)

(58) Field of Classification Search
CPC ...... F16B 37/043; F16B 37/065; F16B 19/06; F16B 5/04
USPC ....................................................... 411/501
See application file for complete search history.

(56) References Cited

U.S. PATENT DOCUMENTS

| | | | | |
|---|---|---|---|---|
| 1,249,948 | A | * 12/1917 | Gruber | F16B 37/065 228/136 |
| 3,014,609 | A | * 12/1961 | Hobbs | F16B 37/065 29/509 |
| 3,127,919 | A | * 4/1964 | Swanstrom | F16B 37/068 411/188 |
| 3,770,037 | A | * 11/1973 | Ernest | F16B 35/06 411/184 |
| 4,033,222 | A | 7/1977 | Wilson | |
| 5,006,025 | A | 4/1991 | Duran | |
| 5,797,175 | A | * 8/1998 | Schneider | B23P 19/062 29/520 |
| 5,833,422 | A | 11/1998 | Haga et al. | |
| 6,125,524 | A | * 10/2000 | Mueller | B23P 19/062 29/520 |
| 6,761,520 | B1 | 7/2004 | Dise | |

(Continued)

*Primary Examiner* — Flemming Saether
(74) *Attorney, Agent, or Firm* — Gregory J. Gore, Esq.

(57) ABSTRACT

A fastener for thin panels has a shank with a deformable collar which works in conjunction with a configured mating panel to produce enhanced attachment forces, especially in the case of very thin panels. The mating panel is prepared with a round mounting hole with cross-cut openings or slots. The panel is stamped into a conical section in a preparatory step before installation to provide the fastener with snap-in engagement prior to final pressing. The fastener shank has an undercut located immediately below the collar which is snapped into the prepared hole. Once snapped in, a punch and flat anvil are used to press the deformable band of the fastener tightly against the prepared panel, capturing the panel rigidly between the deformable band and a base of the fastener. During pressing, the material of the fastener collar will also flow into the slots of the panel to prevent rotation.

15 Claims, 5 Drawing Sheets

(56) References Cited

U.S. PATENT DOCUMENTS

| | | | | |
|---|---|---|---|---|
| 6,817,815 | B2* | 11/2004 | Ross | F16B 35/048 |
| | | | | 411/107 |
| 7,124,492 | B2* | 10/2006 | Wojciechowski | B23P 19/062 |
| | | | | 29/515 |
| 7,887,013 | B2* | 2/2011 | Chen | F16B 21/186 |
| | | | | 248/56 |
| 8,096,743 | B2* | 1/2012 | Babej | F16B 37/068 |
| | | | | 411/179 |
| 2003/0017025 | A1 | 1/2003 | Wojciechowski et al. | |
| 2005/0135896 | A1 | 6/2005 | Teal | |
| 2006/0204348 | A1 | 9/2006 | Shuart | |
| 2014/0096366 | A1 | 4/2014 | Honnikoppa | |
| 2017/0114814 | A1* | 4/2017 | Maloney | F16B 37/068 |

\* cited by examiner

FASTENER FOR THIN SHEET MATERIAL

RELATED APPLICATIONS

This is a non-provisional patent application related to provisional patent application Ser. No. 62/760,508 filed on Nov. 13, 2018 entitled, "Fastener for Thin Sheet Material" priority from which is hereby claimed.

FIELD OF THE INVENTION

The present invention is in the field of clinch type fasteners or rivets. More specifically, it relates to fasteners of the type which deform to capture the host material to which they are attached.

BACKGROUND OF THE INVENTION

Micro fasteners have been getting smaller and are usually applied in very thin sheets of metal. This helps minimize the space needed in an assembly. Fasteners that work well in these applications have been loose fasteners that can be removed and clinching and rivet fasteners which give a permanent connection.

Clinching fasteners will usually offer a high push-out and torque-out performance but they require a displacer, an undercut, and a shank on the fastener. Clinch fasteners come in different forms but they all share the fact that the push-out resistance features and the torque-out resistance features are independent of each other.

The push-out forces are produced by the displacer on the fastener engaging with the panel causing the material to flow into the undercut on the fastener. The torque-out forces are created by knurls that engage with the mating panel which prevent the fastener from rotating in place. Additional sheet thickness is required so the material can flow into the undercut.

Due to the sheet thickness requirement, thin sheet applications such as consumer electronics need to use thicker panels which risks the overall thickness of the assembly which is usually not favorable in the electronics industry. For a thinner panel, rivet nuts have been used because they do not distort the base material but offer a high torque-out and push-out performance. The nut is placed in the hole and the installation tool engages by the threads on the inside. When the tool pulls on the threads, it causes the thinner material to bulge to the side. This usually results in material from the fastener being prominent on both sides of the panel. This may be unfavorable because it adds thickness when all pieces are assembled. Some rivet nuts can be manufactured with a flat head that allows one side to be flush, but it needs greater panel thickness to add that feature.

Illustrations 1A and 1B of FIG. 1 depict a prior art fastener which utilizes a deformable band of material 13 employed to capture a sheet of material 15 between the band and the head 17 of the fastener when pressed between punch 11 and anvil 19. The assembly utilizes a flat panel with a simple round hole. It is deficient in that it exhibits poor torque-out performance and the fastener head is not flush with the backside of the panel.

Considering that standard clinching and rivet technology utilized in the prior art is difficult or impossible to use with such thin sheets, there is a need in the art for a fastening system which can provide improved attachment characteristics with very thin sheets.

SUMMARY OF THE INVENTION

In order to meet the need in the art, the applicant has devised a fastener with a shank having a collar which is a deformable band of material which when properly engaged with its mating panel offers good torque-out and push-out resistance. The purpose of the present fastener is to provide a fastener which can be used with a sheet of 0.1 mm minimum thickness while providing effective push-out and torque-out resistances. While clinch fasteners of the prior art have a shank, an undercut, and a displacer to provide push-out and torque-out resistances the present fastener utilizes structures on the mating panel in conjunction with an undercut as well as a deformed shank collar to produce enhanced attachment forces.

The mating panel of the invention has a round mounting hole with cross-cut openings or slots cut into the panel in the area of the mounting hole. The panel is also stamped into a conical portion around the mounting hole. These features allow temporary snap-in engagement in a preparatory step before final installation. The fastener shank has an undercut located immediately below the collar of deformable material which receives the panel as the shank is snapped into the prepared hole. Once snapped in, a punch and flat anvil are used to press the deformable collar of the fastener tightly against the prepared panel, capturing the panel rigidly between the collar and a base of the fastener. The material of the fastener collar will also flow into the slots of the panel to prevent rotation. The use of a flat anvil allows the fastener to be installed flush on one side. Panels may be very thin of say 0.1 mm thickness.

More specifically, the applicant has invented a fastener, comprising a shank having a base at a bottom most end thereof, said base being the largest diameter of the fastener. A deformable collar on the shank of greater diameter than the shank includes an undercut in the shank having a inner wall of lesser diameter than the shank. The undercut is located immediately below the collar. The shank may be threaded internally or externally.

The fastener can be used in a panel assembly where the fastener is affixed to a panel having a top side and a back side. The panel preferably has a raised conical portion extending upwardly from the panel top side which defines a recess in the panel back side. A mounting hole is centered at the apex of the conical portion and defines a top of the conical portion. When assembled the fastener shank extends upwardly through the mounting hole and the conical portion of the panel is thereby captivated between the collar and the base.

In accordance with the above described assembly, the base lies wholly within the backside recess and elements of the conical portion lie within the undercut. The top edge of the conical portion abuts the inner wall of the undercut to strengthen the attachment. A plurality of radial slots can be employed in the conical portion of the panel. After a pressing assembly step portions of the deformable collar lie within the slots to resist rotation of the fastener in the panel. The panel can be of uniform thickness and composed of resilient material whereby the fastener can be temporarily affixed to the panel by snap-fit. In one embodiment, there are four radial slots in a cross-cut pattern, each extending from the mounting hole to a circumference of the conical portion creating four tabs, each extending from the mounting hole to the circumference of the conical portion.

In one method of rigidly affixing the fastener to the panel assembly the deformable collar is pressed against the conical portion in the direction of the base thereby rigidly clamping the conical portion between the collar and the base. Due to the pressing, portions of the deformable collar flow into and remain within the radial slots.

Thus, it is the main object of the invention to provide a fastener for very thin panels with enhanced push-out and torque-out performance. This and other objects and advantages of the inventive fastener and panel assembly will be apparent to those of skill in the art from the following figures of drawing and description of one embodiment thereof. Like numbering of the same features is used throughout the drawings.

DESCRIPTION OF THE PREFERRED EMBODIMENT

Figure 1A:
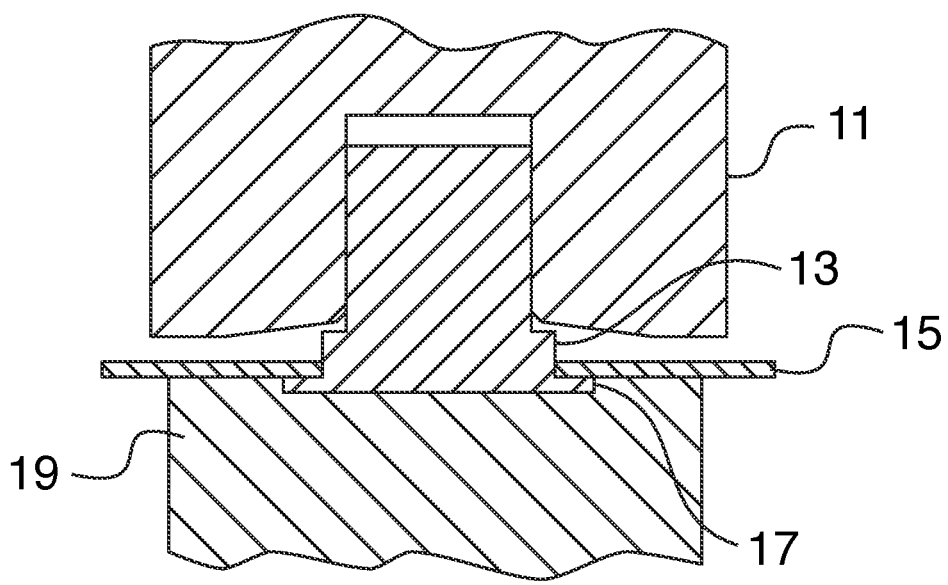
FIG. 1 consists of illustrations 1A and 1B which are side-by-side sectional elevation installation sequences of a prior art fastener.
Figure 1B:
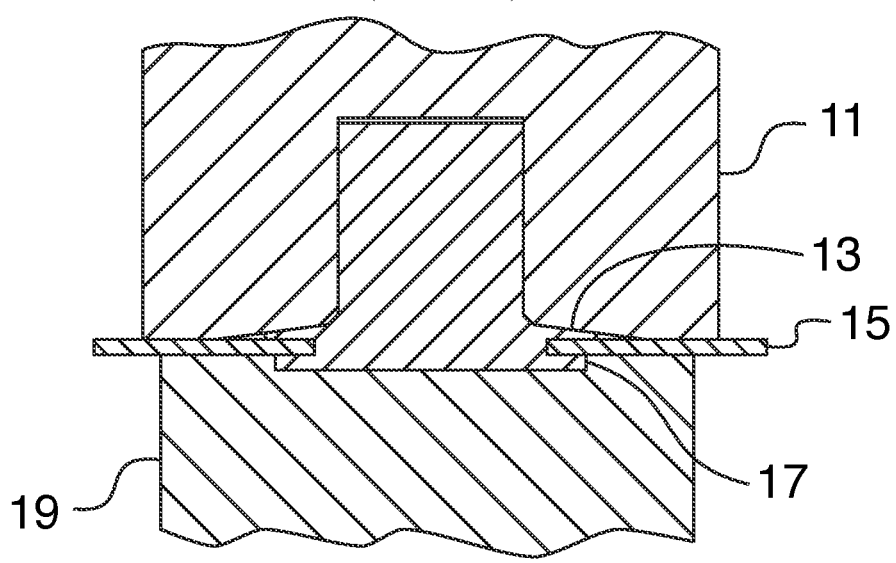
Figure 2:
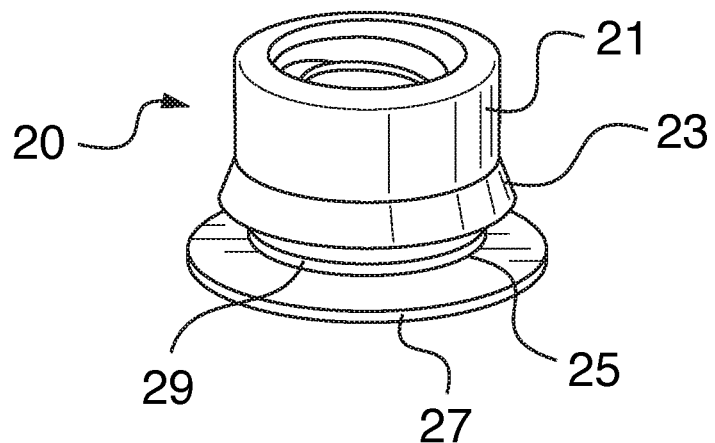
FIG. 2 is a top front isometric of an embodiment of the invention

Referring now to FIG. 2, we see the three main features of the fastener 20 comprising: a shank 21 with a deformable tapered band or collar 23, an undercut 25, and a base 27. Undercut 25 includes an inner wall 29 at its junction with the shank 21.

Figure 3:
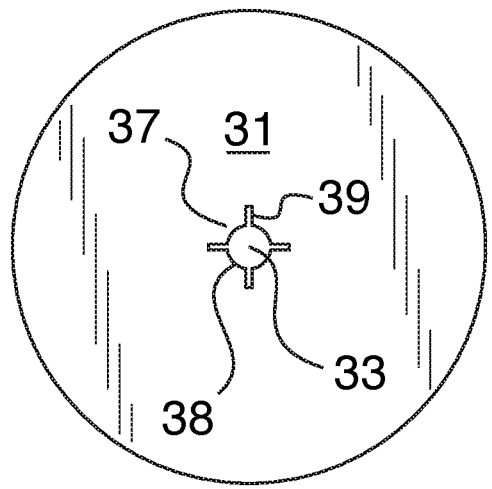
FIG. 3 is a top plan view thereof.
Figure 4:
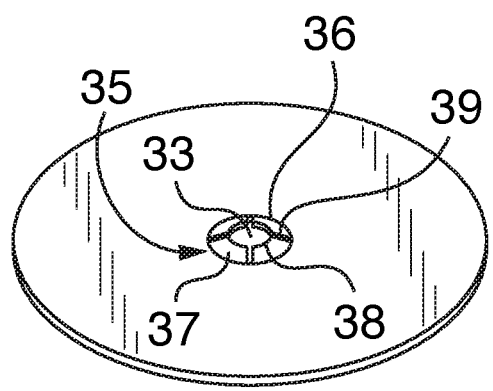
FIG. 4 is a top right isometric view.

As seen in FIGS. 3 and 4, the fastener is used in conjunction with a panel 31 having a mounting hole 33 centered within a conical recess 35 that is stamped into the panel 31. The conical section 35 has a circumference 36 and is divided into segments or tabs 37 by a cross pattern of slots 39. Each of the tabs have a gripping edge 38 at their ends.

The slots are added in part to allow the panel tabs 37 to flex as they are pressed around the deformable collar 23 of the fastener 20. A cross cut pattern is used to create four tabs 37 that move into place in the undercut 25 during a preliminary snap-in assembly of the fastener 20 to the panel 31. The conical stamping allows the panel to bend in a desirable way that will permit the fastener to easily snap into place. When snapped on from the top of the shank 21 of the fastener 20 of FIG. 2, the panel 31 clips into the fastener undercut 25 which is located immediately below the deformable collar 23 on the shank 21. The shank 21 is wider than the mounting hole 33 cut into the panel 31 which prevents push through of the fastener upon initial snap-in engagement prior to full installation.

Figure 5:
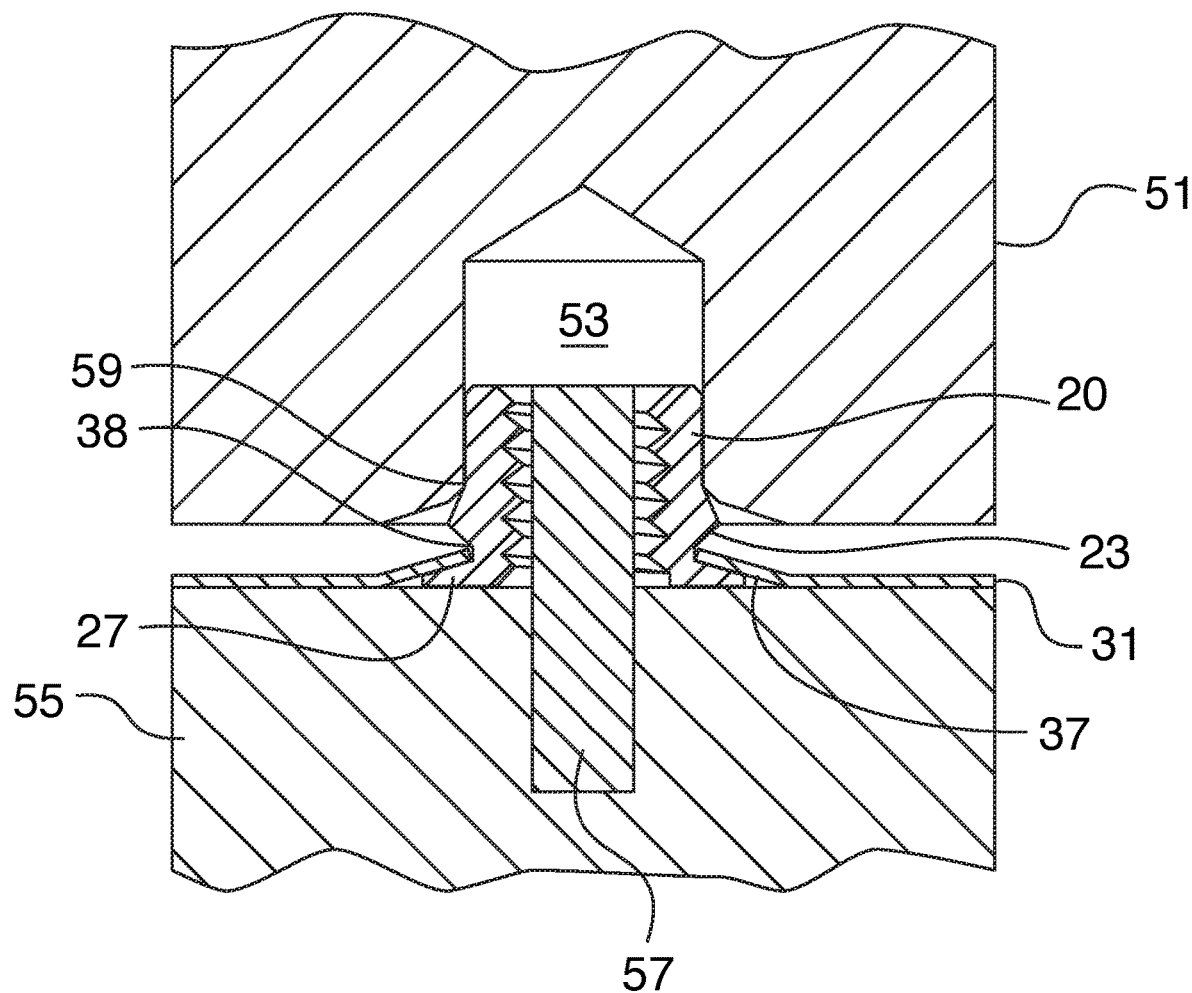
FIG. 5 is a front elevation sectional view.
Figure 6A:
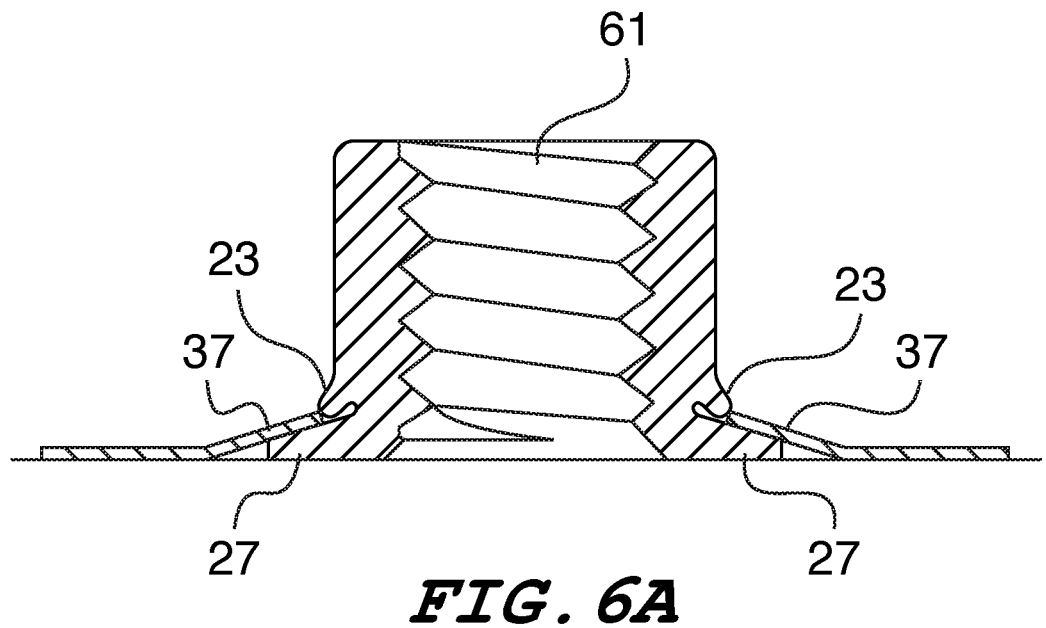
FIG. 6 consists of illustrations 6A and 6B which are elevation sectional views of an installed fastener of the invention.

Referring now to FIG. 5, after this initial preparatory snap-in step of the installation process, the fastener 20 and panel 31 are placed into a press punch 51 having receiving cavity 53. The gripping ends of the panel tabs 38 abut the shank within the undercut. The punch 51 and the fastener 20 are then aligned on pin 57 of anvil 55 to ensure even distribution of the material of the deformable collar 23. With a conical shape pre-stamped into the panel, the collar 23 as it is deformed will press easily against the panel tabs 37 which occupy the undercut 25. As the fastener's deformable collar 23 is pressed by the punch 51, the collar material flows into the panel cross-cut slots creating a resistance to rotation as seen in FIG. 6A. The punch 51 has a rounded edge 59 to displace the material as it presses down to guide the material into the panel slots. The radius 59 is sized so that it will not shear off the deformable collar. The installation process stops when the punch contacts the top of the panel 31 supported by flat anvil 55.

Figure 6B:
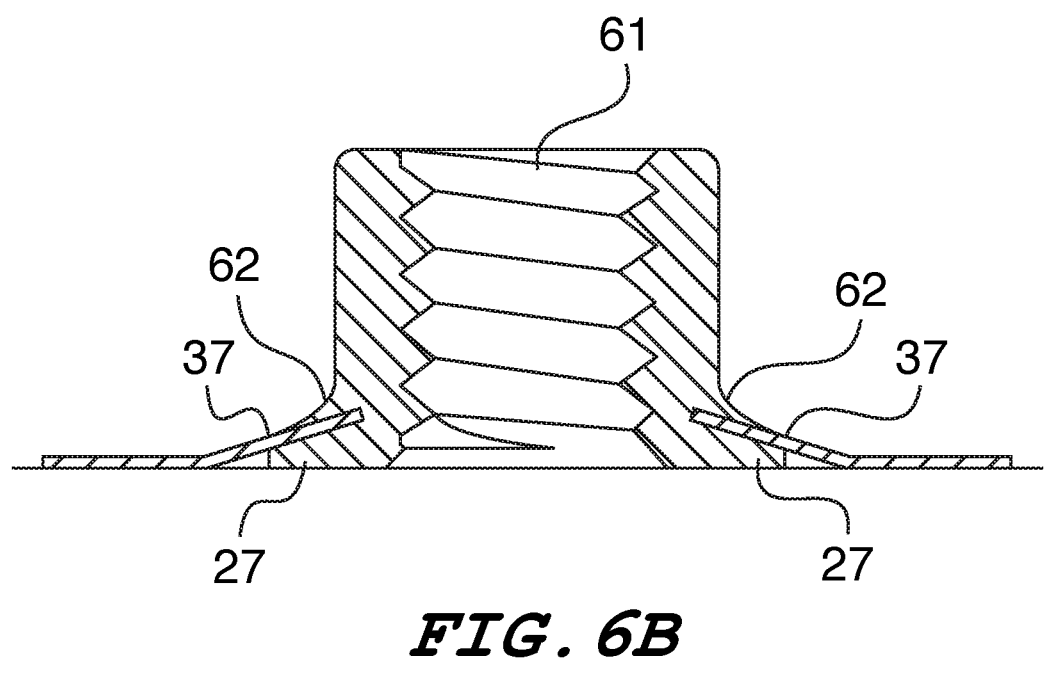

Referring now to FIGS. 6A and 6B, after the fastener/panel assembly seen in FIG. 5 is pressed, the fastener remains secured and rigidly captured onto the panel by the deformable collar. The push-out resistance is aided by the conical shape in the panel material. By this geometry, as the fastener is pushed in a direction opposing the installation, the mounting hole tightens on the fastener preventing push-out. Fastener torque resistance is achieved by pressing some of the deformable collar into the cross slots radiating from the mounting hole as seen in FIG. 6A. As seen in this Figure the fastener base 27 occupies the recess in the conical portion of the panel thus providing a flush attachment when a flat anvil is used.

FIGS. 6A and 6B of FIG. 6 are sectional views taken from a front view and a side view, respectively. In FIG. 6A a front sectional view taken through the opposing slots on the sides of the fastener shows collar material 23 having flowed into the slots and touching the fastener base 27. In FIG. 6B the sectional side view shows the panel tabs 37 captured between the fastener base 27 and the collar 23, which has spread along the top of the panel forming a flange 62. This construction necessarily benefits from deforming the fastener's material because the panel is already very thin and hard, making traditional clinching impossible. The embodiment of FIG. 6 has an optional internally threaded bore 61.

Figure 7:
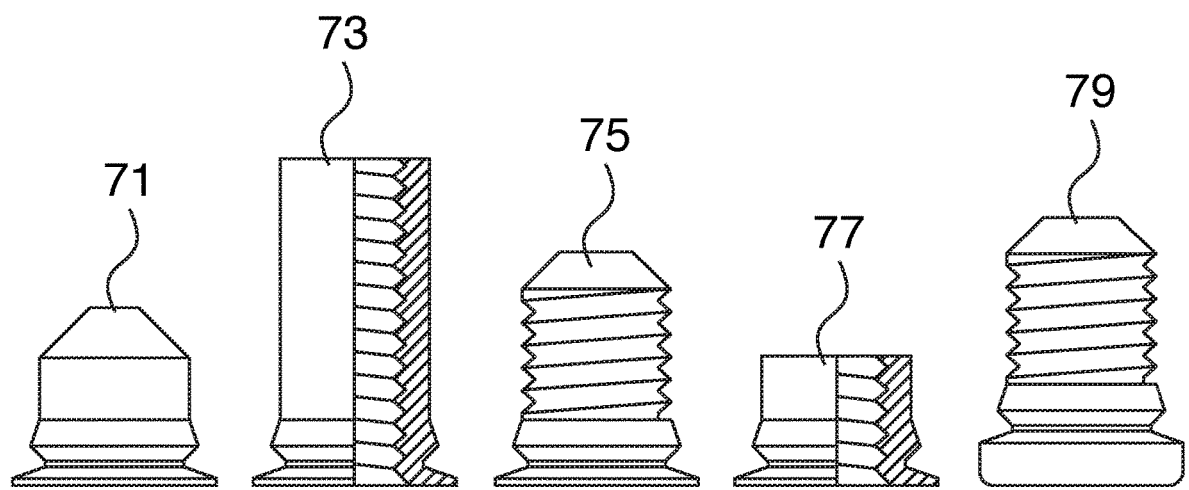
FIG. 7 depicts elevation and sectional elevation views of various embodiments of the invention.

FIG. 7 depicts the operative features of the invention adapted to different types of fasteners to provide a solution to other applications that require installation into very thin, hard panels. From left to right these illustrations depict the following: a pin 71, a standoff with an internally threaded bore 73, an externally threaded stud 75, a nut 77 and a threaded stud with an enlarged head 79.

With the present invention the force of attachment is enhanced compared to prior art clinch nuts of the same thread diameter in two ways. First, torque-out resistance is greatly increased by the portions of the deformable collar which is embedded in the slots between the conical portion tabs. Secondly, the top edges of the tabs wedge into undercut area against the undercut inner wall in direct reaction to pull-out forces which increases pull-out resistance.

Thus, from the foregoing description of the various embodiments of the invention it will be apparent to those of skill in the art that the objects of the invention have been achieved. The present fastener has the following advantages over the prior art:

1) Standard clinch features require thicker panels; this new configuration makes very thin sheets capable of supporting installations.
2) Standard clinch features can only form weak connections in thin panels and cannot be used with harder host panels.
3) Rivet fasteners cannot provide a flush side for an application on very thin sheets.

Other objects and advantages of the invention will be apparent to those of skill in the art from the foregoing description of various embodiments. It should be understood that the invention shall be limited only by the following claims and their legal equivalents.

What is claimed is:

1. A fastener, comprising:
a shank having a base at a bottom most end thereof, said base being a largest diameter of the fastener;

a deformable collar on the shank of a greater diameter than the shank;

an undercut in the shank having a inner wall of a lesser diameter than the shank and located immediately below the collar; and wherein the collar is constructed and adapted to receive an external axial force whereby portions of the collar deform and flow into the undercut to captivate a panel between the collar and the base.

2. The fastener of claim 1 wherein the shank has a threaded axial bore.

3. An assembly of a fastener to a panel, comprising:

the fastener of claim 1 affixed to a panel, said panel having a top side and a back side:

the panel having a raised conical portion extending upwardly from the panel top side and defining a recess in the panel back side;

a mounting hole centered at the apex of the conical portion, said hole defining a top edge of the conical portion; and wherein the fastener shank extends upwardly through the mounting hole and the conical portion of the panel is captivated between the collar and the base.

4. The assembly of claim 3 wherein the base lies wholly within the back side recess.

5. The assembly of claim 3 wherein elements of the conical portion lie within the undercut.

6. The assembly of claim 5 wherein the top edge of the conical portion abuts the inner wall of the undercut.

7. The assembly of claim 5 wherein the fastener shank has a threaded axial bore.

8. The assembly of claim 5 wherein the panel is of uniform thickness.

9. The assembly of claim 3 wherein the panel has a plurality of radial slots in the conical portion.

10. The assembly of claim 9 wherein there are four radial slots in a cross-cut pattern, each extending from the mounting hole to a circumference of the conical portion.

11. The assembly of claim 10 wherein the conical portion consists of four tabs, each extending from the mounting hole to the circumference of the conical portion.

12. The assembly of claim 9 wherein portions of the deformable collar lie within the slots.

13. The assembly of claim 3 wherein the panel is composed of resilient material whereby the fastener is affixed to the panel by snap-fit.

14. A method of rigidly affixing the fastener to the panel in the assembly of claim 3 with a step of pressing the deformable collar against the conical portion in the direction of the base thereby rigidly clamping the conical portion between the collar and the base.

15. The method of claim 14 whereinafter the step of pressing, portions of the deformable collar lie within the radial slots.

* * * * *